Nov. 9, 1971  J. R. SAGMULLER ET AL  3,618,356
EXTRUDING APPARATUS
Filed Sept. 5, 1969
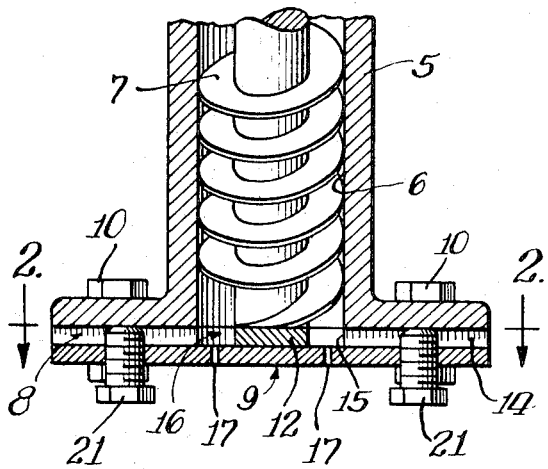
Fig. 1.
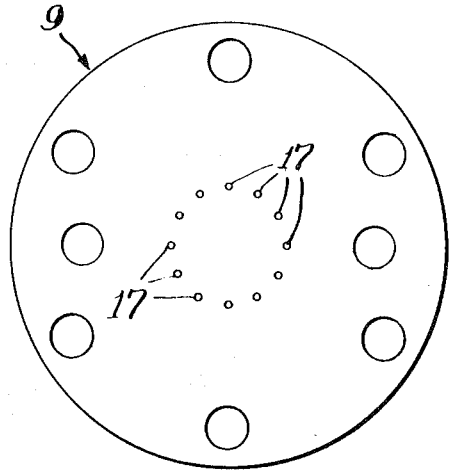
Fig. 3.
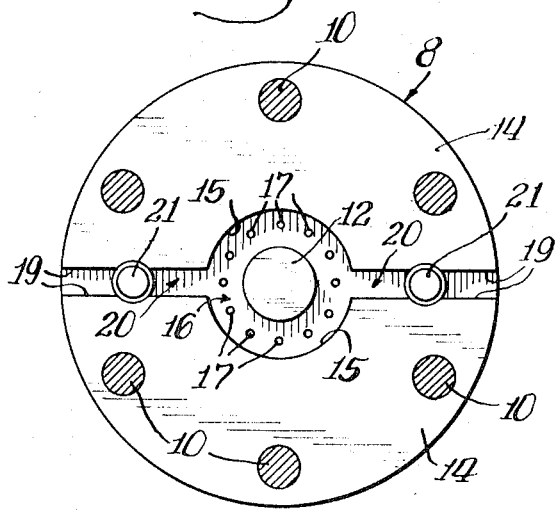
Fig. 2.
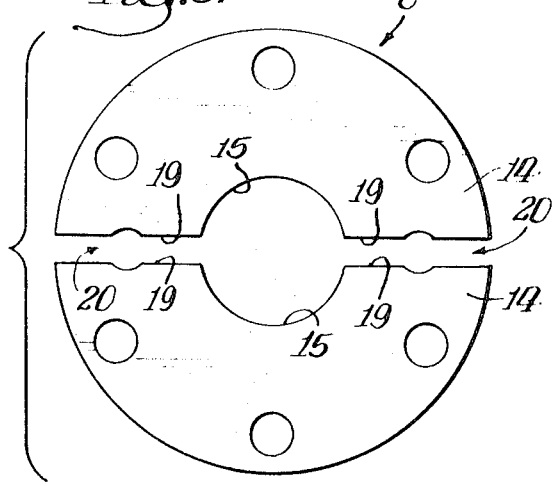
Fig. 4.
Fig. 5.
Inventors:
Joseph R. Sagmuller,
John F. Joyce,
By Brown, Jackson, Boettcher & Dienner Attys.

United States Patent Office 3,618,356
Patented Nov. 9, 1971

3,618,356
EXTRUDING APPARATUS
Joseph R. Sagmuller and John F. Joyce, Columbus, Ohio, assignors to National Standard Company, Niles, Mich.
Filed Sept. 5, 1969, Ser. No. 855,587
Int. Cl. B21c 23/00; D01d
U.S. Cl. 72—262
7 Claims

ABSTRACT OF THE DISCLOSURE

An extruding apparatus embodying die means for effecting the extrusion of an extrudable material into a plurality of elongated articles at a uniform rate.

BACKGROUND

In the fabrication of an elongated article, such as wire, tubing or strip formed by extruding certain metal compounds into a continuous elongated extrusion which is then reduced and sintered, no particular difficulty exists when the die plate of the extruding apparatus has but a single die orifice. However, utilizing extruding apparatus for the formation of a single article, such as wire, is uneconomic. It is necessary that a large number of extruded articles be formed simultaneously and at the same rate for subsequent processing such as reducing and sintering of the several extrudates. It has been found by employing the same expedients in extruding a single elongated extrudate but having die plates formed with a plurality of die orifices there is a non-uniformity of the extrusion rate from die orifice to die orifice.

Typical metal compounds with which the present invention may be employed were produced in the following manner. The bi-product iron oxide, from spent pickle recovery was milled in a conventional manner until 50 percent of the iron oxide particles were less than 0.80 micron and 50 percent being in a range of from 0.80 micron to 10 microns. The aforementioned micron sizes were determined by a Coulter counter measurement and it will be understood that particle size means size as thus determined. A binder was then prepared by adding two grams of pregelatinized starch (Amijel BO–12) to 12.8 milliliters of tap water and heating the solution until a gel was formed. The binder thus formed was then added to 100 grams of the milled iron oxide and the combination then intimately mixed. An alternative particulate metal compound was formed by calcining the aforenoted HCL oxide at a temperature of 900° F. for 20 minutes. After calcining the material was then ball milled until the above noted particle size distribution was re-established. 100 grams of the ball milled calcined material was then mixed with a binder composed of two grams of pregelatinized starch (Amijel BO–12) with 14.8 milliliters of tap water. The two aforedescribed metal compounds are illustrative of metal compounds which may be successfully extruded with the preferred form of extruding apparatus hereinafter described.

In view of the foregoing the present invention addresses itself to providing an extruding apparatus embodying a die plate having more than one die orifice and in which material to be extruded is extruded through the die orifices at a uniform rate for subsequent processing. This problem has been solved by providing a die plate with a plurality of die orifices disposed concentrically of the axis of the auger screw of the extruder, and an arrangement of components at the discharge end of the auger screw for disposing the material to be extruded at uniform pressure in the form of an annulus having its axis normal to the die plate for passage through the die orifices.

BRIEF DESCRIPTION OF THE DRAWING

FIG. 1 is a vertical sectional view of the lower end of an extruder constructed in accordance with the principles of the invention;

FIG. 2 is a horizontal sectional view taken along the line 2—2 on FIG. 1 and looking in the direction indicated by the arrows;

FIG. 3 is a plan view of the die plate embodied in the apparatus of FIG. 1;

FIG. 4 is a plan view of a center plate for association with the die plate; and

FIG. 5 is a plan view of spacer plates arranged between the bottom end of the housing of the extruder and the die plate.

DESCRIPTION OF A PREFERRED EMBODIMENT OF THE INVENTION

Referring now to FIG. 1, there is shown an extruding apparatus constructed in accordance with the principles of the present invention. The apparatus comprises a conventional auger housing 5 having an inner cylindrical surface 6 within which housing the auger screw 7 is mounted for rotation in a known manner for advancing extrudable material through the discharge end of the auger housing.

An assembly comprising spacer plate means 8 and a die plate 9 is mounted at the discharge end of the auger housing by a plurality of bolt and nut means 10, the bolts of which pass through appropriate holes formed inwardly of the peripheries of the spacer plate means 8 and die plate 9 with the spacer plate means between the discharge end of the auger housing 5 and die plate 9.

A circular center plate 12 is positioned centrally of die plate 9 and is made fast thereto in any suitable manner. As shown, the circulater center plate 12 is of the same diameter as the shaft of the auger screw 7. The spacer plate means 8, as best shown in FIG. 5, comprises a pair of arcuate plate members 14 having inner arcuate edges 15 which when assembled at the end of the auger housing are in opposing relation. The arcuate edges 15 each lie on a radius substantially equal to the radius of the inner cylindrical surface 6 of the auger housing which thus in effect form a substantially continuous cylindrical surface from the discharge end of the auger housing to the die plate 9. The outer peripheral edge of the center plate 12 and the arcuate edges 15 of the spacer plates 14 thus define an annular chamber 16 at the discharge end of the auger housing for receiving the extruded material from the auger screw 7.

The die plate 9 is formed with a plurality of die orifices 17 disposed with their centers on a circle concentric with the axis of the auger screw 7 and communicate with the annular chamber 16 at the discharge end of the auger.

The spacer plates 14 are also formed with opposed straight edges 19 extending outwardly from the arcuate inner edges 15 forming slots 20 which define bleed means for bleeding extrudable material from the discharge end of the auger housing. A pair of adjustment screws 21 have threaded engagement with the die plate 9, the inner ends of which are extended into the bleed slots 20 so that upon the inwardly and outwardly threading of the adjustment screws, the rate of discharge of the extrudable material through the bleed means may be adjusted. The aforedescribed adjustment means provides for adjusting the extrusion speed from the auger screw 7 and through the die orifices 17 to provide for the desired rate of speed of extrusion through the die openings.

The earlier described metal compounds were successively extruded in an apparatus above described in which the die plate 9 was formed with twelve die orifices of 0.016 inch diameter having their center on a 1½″ circle.

The invention claimed is:

1. An extruding apparatus comprising an auger housing, an auger screw rotatable in said auger housing for advancing extrudable material through the discharge end of said auger housing, a die plate at said discharge end of said auger housing, said die plate having a plurality of die orifices disposed concentrically of the axis of said auger screw, and a circular center plate between said die plate and the outer end of said auger screw, said center plate being disposed immediately adjacent the outer end of said auger and having its outer periphery lying concentrically within a circle in which the axes of said die orifices lie.

2. An extruding apparatus comprising an auger housing, an auger screw rotatable in said auger housing for advancing extrudable material through the discharge end of said auger housing, a die plate at said discharge end of said auger housing, said die plate having a plurality of die orifices disposed concentrically of the axis of said auger screw, a circular center plate between said die plate and the outer end of said auger screw having its outer periphery lying concentrically within a circle in which the axes of said die orifices lie, and spacer plate means between said die plate and the discharge end of said auger housing, said spacer plate means cooperating with said center plate to define a substantially annular chamber at the discharge end of said auger housing.

3. The extruder of claim 2 in which the auger housing has an inner cylindrical wall and in which the outer diameter of said annular chamber is the same as the diameter of said inner cylindrical wall of said auger housing.

4. The extruder of claim 2 characterized by said spacer plate means embodying bleed means for bleeding extrudable material from the discharge end of said auger housing.

5. The extruder of claim 4 characterized by the provision of adjustment means for adjusting the rate of flow of said extrudable material through said bleed means.

6. The extruder of claim 4 in which said spacer plate means comprises a pair of spacer plates having opposed spaced apart edges forming slots extending laterally outwardly and defining said bleed means.

7. The extruder of claim 6 comprising adjustment means comprising screw means threaded in said die plate for movement relative to said slots for adjusting the rate of flow of said extrudable material through said bleed means.

References Cited
UNITED STATES PATENTS

| | | | |
|---|---|---|---|
| 2,814,851 | 12/1957 | Hervey | 18—8 SF |
| 3,078,509 | 2/1963 | Killoran | 18—8 SF |

CHARLES W. LANHAM, Primary Examiner

R. M. ROGERS, Assistant Examiner

U.S. Cl. X.R.

18—8 SF